L. BONNET.
Meat Cutter.
No. 29,239.
Patented July 24, 1860.
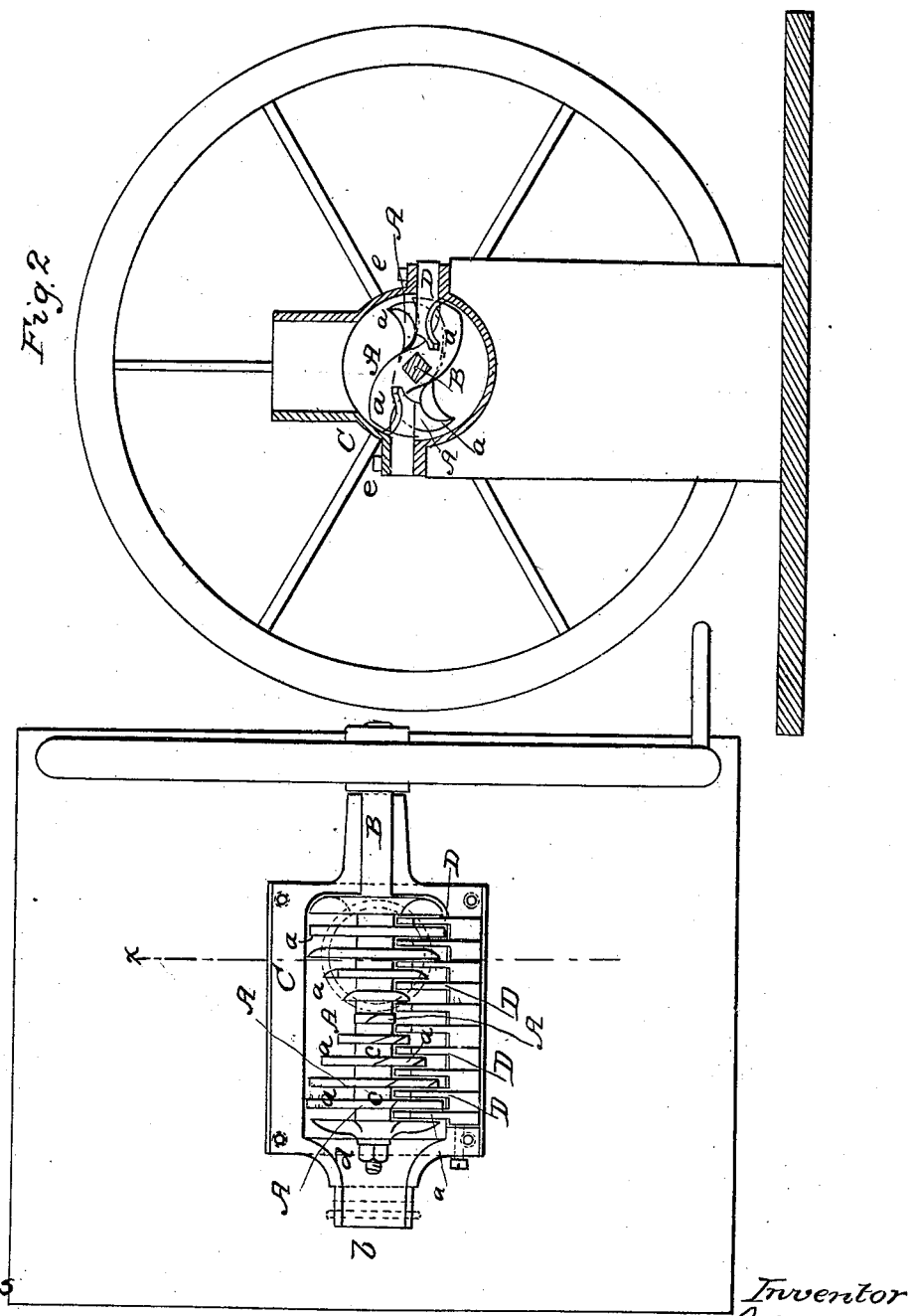
Witnesses
C Hughes
Inventor
L. Bonnet

UNITED STATES PATENT OFFICE.

LOUIS BONNET, OF NEW YORK, N. Y.

IMPROVED MEAT-CUTTER.

Specification forming part of Letters Patent No. 29,239, dated July 24, 1860.

*To all whom it may concern:*

Be it known that I, LOUIS BONNET, of the city, county, and State of New York, have invented a new and Improved Machine for Cutting Meat, &c.; and I do hereby declare that the following is a full, clear, and exact description of the same, reference being had to the accompanying drawings, forming a part of this specification, in which—

Figure 1 represents a longitudinal vertical section of my invention. Fig. 2 is a transverse vertical section of the same, the line $x$ $x$, Fig. 1, indicating the plane of section.

Similar letters of reference in both figures indicate corresponding parts.

To enable those skilled in the art to make and use my invention, I will proceed to describe its construction and operation with reference to the drawings.

The cutters A are secured to a rotary shaft B, passing through the interior of the concave or shell C. The cutters are all made separate and of the same shape, having the arms $a$ with concave cutting-edges, and they are placed spirally on the shaft, so that they do not come into action at the same moment, and at the same time, by reason of the spiral position of the cutters, the meat or other substance is fed toward the discharge-opening $b$ of the concave, so that no extra device for feeding or discharging is required.

The cutters are separated from each other by collars or rings $c$, and they are secured to the shaft by a common screw and nut $d$. They act against stationary knives D, which are secured on the sides of the concave by means of the same screws $e$ that serve to fasten the upper half of the concave to its lower half. The cutting-edges of these knives are also made concave, as clearly shown in Fig. 2, and as the meat or other substance is hooked in by the cutters A it is caught between the cutting-edges of said cutters and those of the knives and separated gently and without tearing. The shanks of the knives D are made broader than their projecting parts or cutting-blades, and space is thus left between the blades for the passage of the revolving cutters A. The shanks of the knives D also form a filling between the two halves of the concave, thus forming a portion of the interior or wall of the hollow cylinder within which the cutters A revolve.

The peculiar advantages of this machine are that it does a large amount of work with a comparatively small expenditure of power. By placing the cutters in a spiral position the meat or other substance as it enters the concave is pushed forward, leaving to the same no chance to clog up the machine, and by the peculiar action of the concave cutting-edges every particle of the meat or other substance to be chopped is cut clear through without heating. It is also very easy to keep this machine in proper working order. If one of the cutters or knives breaks or becomes deranged, it can easily be taken out and replaced by another without disturbing the rest.

Having thus fully described my invention, what I claim as new, and desire to secure by Letters Patent, is—

The arrangement of the shanks of the stationary knives D between the flanges of the concaves so that the inner surfaces of the open parts of said shanks shall constitute a part of the hollow cylinder, all as herein shown and described.

L. BONNET.

Witnesses:
C. HUGHES,
L. W. BENDRÉ.